Patented July 24, 1923.

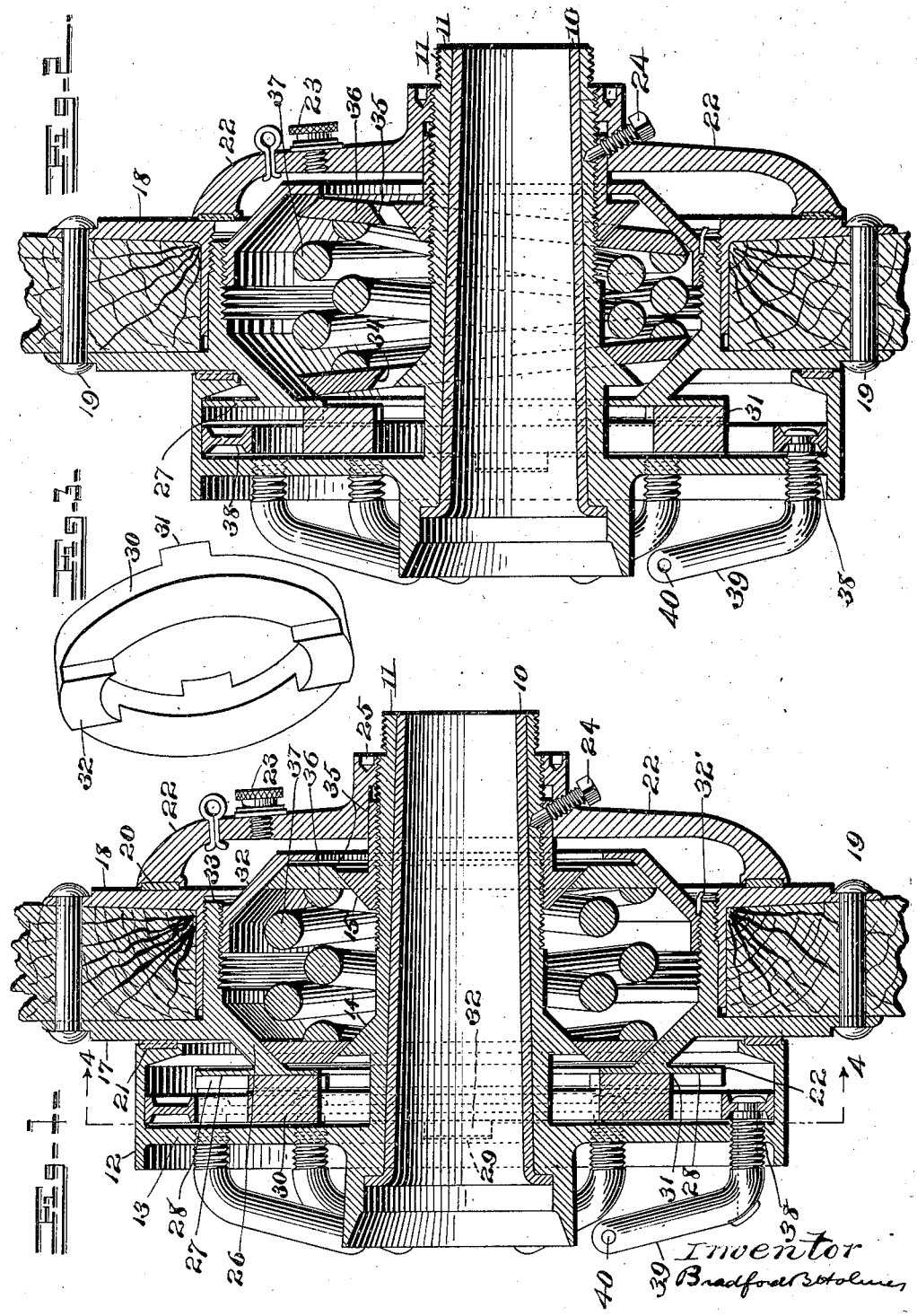
July 24, 1923.
B. B. HOLMES
SPRING WHEEL
Filed Aug. 21, 1919   2 Sheets-Sheet 1
1,463,135

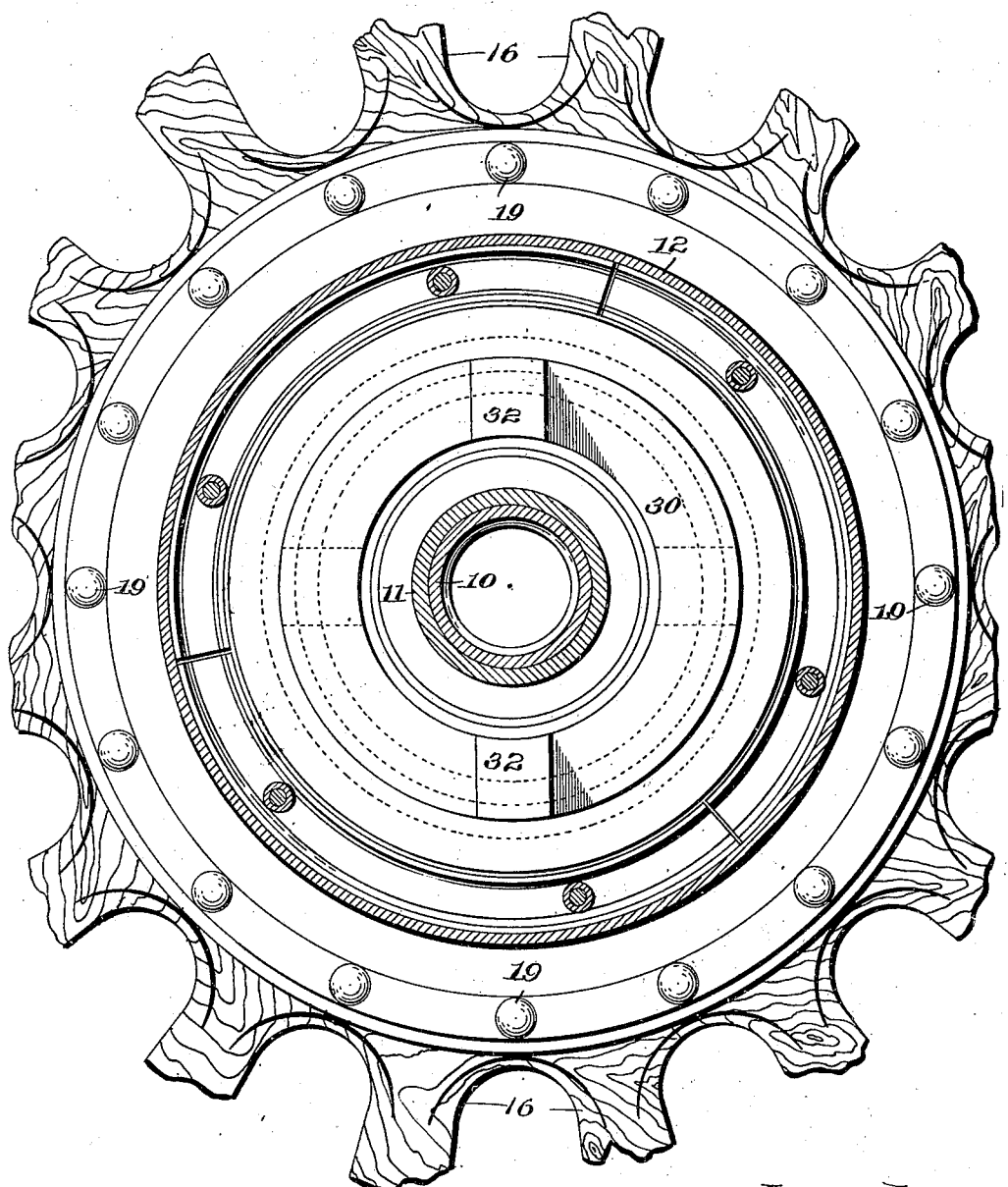

1,463,135

UNITED STATES PATENT OFFICE.

BRADFORD B. HOLMES, OF THE UNITED STATES ARMY.

SPRING WHEEL.

Application filed August 21, 1919. Serial No. 318,956.

(FILED UNDER THE ACT OF MARCH 3, 1883, 22 STAT. L., 625.)

*To all whom it may concern:*

Be it known that I, BRADFORD B. HOLMES, a citizen of the United States, major, Coast Artillery, United States Army, stationed at Washington, D. C., have invented an Improvement in Spring Wheels, of which the following is a specification.

The invention described herein may be used by the Government, or by any of its officers or employees in prosecution of work for the Government, or by any other person in the United States, without payment to me of any royalty thereon, in accordance with the act of March 3, 1883.

This invention relates to spring wheels, and more particularly to wheels containing the spring element at the hub.

The object of this invention is to provide a practical spring wheel for field artillery, it being impractical to provide the gun carriage with springs between the recoil mechanism and axle.

A further object is to provide a wheel which can be locked, that is, the spring element can be nullified, during firing so that the gun will not jump on its carriage during recoil and counter-recoil.

While the preferred embodiment as shown in the drawings is an artillery wheel, it will be understood that this invention is also applicable in a wide variety of special relations, such as in wheels for trucks, trailers, automobiles and the like.

Reference is made in the description of this invention to the accompanying drawing in which like reference numerals designate corresponding parts throughout the several views and in which, Fig. 1 is a longitudinal section of the wheel hub in its normal position, looking from the front.

Fig. 2 is the same section showing the wheel hub in its sprung position.

Fig. 3 is a sketch of the "Oldham" type coupling used to connect the wheel and brake drum.

Fig. 4 is a longitudinal section of the wheel hub taken on line 4—4, Fig. 1.

The hub portion of the wheel is indicated by the numeral 11 and comprises the integral disc plate 13 formed on one end thereof which terminates in the brake drum 12. The opposite end of hub 11 is reduced in diameter and cut to form screw threads for a lock nut or cap of any suitable type. Intermediately the hub 11 is also formed with screw threads which engage corresponding threads on the conical member 15 which permits longitudinal adjustment thereof so as to vary its distance from the conical member 14 which is preferably integral with hub 11. An axle bearing is provided by means of the bushing 10 which is pressed or inserted in any suitable manner in the hub 11.

The spokes 16 are held between the bearing plates 17 and 18, which with rivets 19 form the spoke holding portion. The plate 17 has an integral extension which slants downward at an angle of about 45° forming a conical surface 26 and this slanting extension terminates in an annular flange 27. This flange 27 has two slots 28 set at 180 degrees apart. The hub disc plate 13 also has two similar slots 29 cut therein 180 degrees apart and at 90 degrees from the slots 28. Between plate 13 and flange 27 is an Oldham coupling plate 30, with lugs 31 fitting into slots 28 and lugs 32 fitting into slots 29. The Oldham coupling in this case is used to transmit rotary motion from the wheel to the brake drum 12 and hub 11 and permit relative motion between the spoke holding portion and hub but it is also evident that it may be used to transmit motion from a chain sprocket or from an axle or drive shaft to the wheel. The plate 17 at the junction of its extension 27 is formed with an oppositely projecting annular flange 33 which is threaded on its interior and exterior surfaces.

Opposite the conical surface 26 on plate 17 is a supported plate 2 having a conical shaped surface and an annular base which is threaded so that it may be adjustably mounted in the interior threads of flange 33 and when in adjusted position it is locked by locking pin 2'. Contacting with surfaces 26 and 14 which slant in opposite directions is a circular plate 34, the outer surface of which corresponds in angularity to the slope of surface 26 while the inner surface corresponds in slant to the slope of the surface of member 14. A similar plate 35 contacts with the surface of member 15 and surface 2. These plates 34 and 35 are held in frictional contact with their corresponding surfaces 26, 14 and 2, 15 respectively, by the helical springs 36 and 37.

The plate 18 is adjustably threaded on the exterior threads of annular flange 33 of plate 17 thus holding the spokes 16 firmly in place between the two plates, but this is further reenforced by the rivets 19 that extend through both plates and also the material of the spoke. The outside surfaces of plates 17 and 18 are machined and are in sliding contact with the brass bearing rings 20 and 21 which fit in a slot in the bearing plate 22 and brake drum 12 respectively. These rings 20, 21 retain the spoke holding portion firmly in a plane perpendicular to the axle and hub but allow it to slide freely in such perpendicular plane. Lugs 31 and 32 of the Oldham coupling are adapted to be moved in their corresponding slots to permit this sliding motion. Bearing plate 22 engages the intermediate screw threads on the hub and is screwed into position after adjustable cone 15 is in place and is adjusted until rings 20, 21 form a snug sliding fit with the machined surfaces of plates 17, 18. It is then locked in this position by the cap screw 24 which also locks conical member 15 in place. Plate 22 is equipped with a grease inlet 23 and is also provided with holes 25 for locking the hub cap (not shown) and also for the reception of a suitable tool used in assembling plate 22.

Three similar segmental plates 38 of rigid material and preferably channel section each extending 120°, form a complete ring and are held in place by the screw handles 39 which thread through the disc plate 13. Each handle has at one end an enlarged head and shoulder forming a groove in which a portion of the web of the channel section of segmental plates 38 engages, whereby the screw handles support the segment and move it laterally. These handles are locked in position by passing a leather thong through the holes 40 at their ends and then tying the thong when the ends of the handles are all pointing toward the axle.

In assembling this device the parts 15 and 32 are adjusted so that the coil springs are under tension sufficient to force plates 34 and 35 into their seats and yieldingly support the load on the wheel. When the wheel is passing over rough terrain any considerable additional pressure thus generated will cause plates 34 and 35 to swing inward so that the plates tilt toward each other at the point of application of the excessive load and away from each other at 180 degrees therefrom as shown in Fig. 2, thereby compressing the lower portion of the helical spring. It will be noted that radial pressure is transmitted to the coil springs located around hub 11 by plates 34 and 35 in a simple and direct manner and without any tendency for the sliding surfaces to bind. The Oldham coupling permits relative movement between the spoke holding portion and hub portion without interruption of the driving connection.

When the gun is to be fired the handles 39 are unlocked and turned so as to force the ring segments 38 between the outside periphery of flange 27 and the inner surface of the brake drum thus establishing direct thrust connection of the wheel to the hub and eliminating the spring element. When it is desired to travel the handles 39 are turned to their original position and the spring element again becomes active.

The elements of this device are combined in a form conducive to durability, certainty in function, ease in manufacture and with small added weight to the wheel.

While this specification makes specific reference to two helical springs, and to conical surfaces, it is contemplated that substitution of one or more springs of different types may be made or that the bearing surfaces may be generated by curved lines and that other changes of design may be made, but such changes conform to my invention when within the spirit and scope of the appended claims.

Having described my invention, what I claim as new and desire to secure by Letters Patent is:—

1. In a spring wheel, yielding means interposed between the hub and spoke portions, a rigid member and means screw threaded in the hub portion for inserting said rigid member between said portions, whereby the yielding means is rendered inactive.

2. In a spring wheel, a hub portion having a brake drum, a spoke holding portion comprising a plate having an annular flange, a yielding means interposed between said portions and adjustable means carried by said hub adapted to be inserted between the interior of said brake drum and flange for forming a direct bearing between said portions.

3. In a spring wheel, a spoke holding portion comprising a side plate having an extension forming a conical surface, a plate having a conical surface and adjustably connected to said side plate, a hub portion having a fixed and an adjustable member, supporting plates co-acting with the conical surfaces of said plates and said fixed and adjustable members, and spring means for holding said plates yieldingly in position.

4. A spring wheel including a hub and spokes, inclined surfaces attached to the hub, inclined surfaces attached to the spokes and yielding means engaging said inclined surfaces, the inclined surfaces adjustable to regulate the tension of said yielding means.

BRADFORD B. HOLMES.